Sept. 16, 1930.  C. H. BECKWITH  1,776,060
PISTON TYPE BOILER CHECK VALVE
Filed July 19, 1929
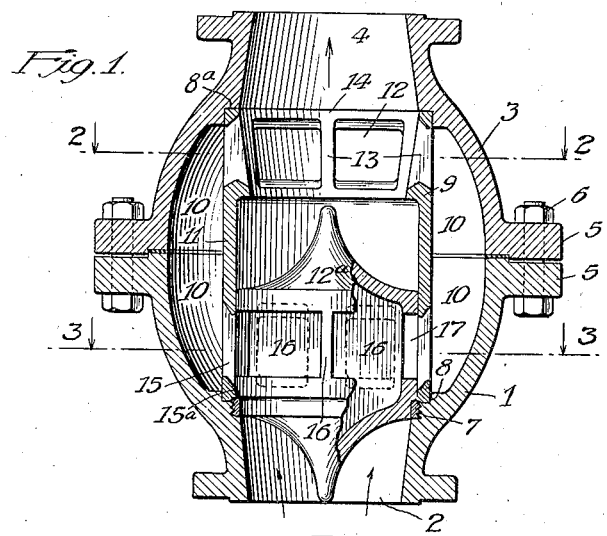
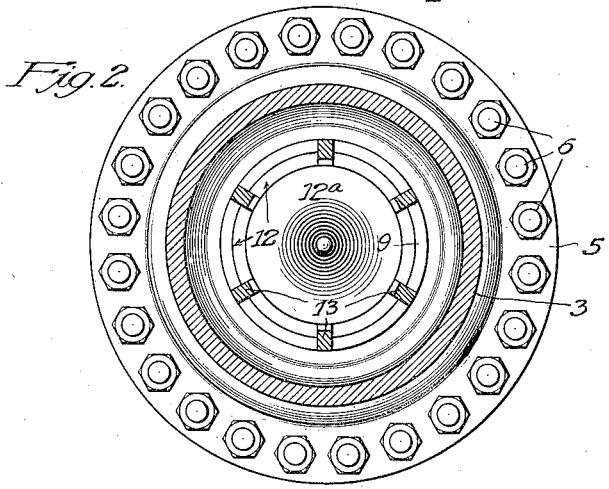
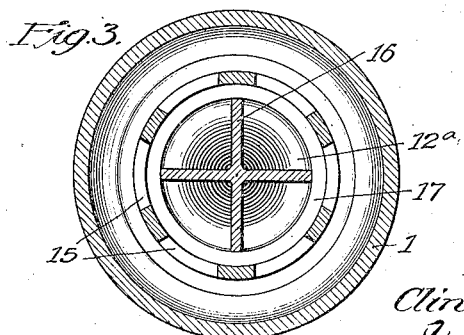
Witness
R. B. Davison
Inventor
Clinton H. Beckwith
By Ira J. Wilson
Atty.

Patented Sept. 16, 1930

1,776,060

UNITED STATES PATENT OFFICE

CLINTON H. BECKWITH, OF GENEVA, ILLINOIS, ASSIGNOR TO CRANE CO., OF CHICAGO, ILLINOIS, A CORPORATION OF ILLINOIS

PISTON-TYPE BOILER CHECK VALVE

Application filed July 19, 1929. Serial No. 379,357.

This invention relates to check valves which are particularly well adapted for use in high pressure lines such as for example, high pressure steam lines feeding high pressure turbines.

It is very desirable, if not essential, that pressure drops in a high pressure line be eliminated as far as possible, otherwise the advantages of high pressure systems are thrown away. As desirable as it is, however, to eliminate these drops in pressure it is likewise as difficult in high pressure work. One cause of pressure drops in transmission lines is check valves and this is particularly true of high pressure systems where the additional problems of maintaining a tight valve is increasingly troublesome.

It is the purpose of this invention therefore to provide a check valve suitable for high pressure work which will not cause a significant drop in pressure as the steam or other fluid passes therethrough and which will always maintain a tight shut-off against back pressure. One cause of a drop in pressure of a fluid passing through a check valve is that the path of the fluid through the valve is usually a tortuous if not a restricted one. Accordingly it is within the contemplation of this invention to provide a check valve which has a full unrestricted opening, which has a minimum deflection of the fluid as it passes therethrough and which has no pivoted or otherwise constructed part which tends, upon wear, to cause an improper seating of the valve even at high pressures. In one form of this invention a piston type valve is employed which is so shaped and positioned in a chamber so shaped that the direct flow of fluid therethrough when the valve is open is not impaired to any substantial degree.

A complete and detailed description of one form of this invention will be given in connection with drawings in which:

Fig. 1 is a vertical section through the center of a check valve constructed in accordance with this invention.

Fig. 2 is a section on line 2—2 of Fig. 1 showing the construction of the upper section of the valve and Fig. 3 is a section on line 3—3 of Fig. 1 showing the construction of the lower half of the valve.

In the illustrated form of this invention the valve body is made principally of two sections, a lower section 1 having an inlet 2 and an upper section 3 having an outlet 4, the two sections being flanged as at 5 in order to be secured together by means of bolts 6. When secured together the two sections form a barrel-like hollow valve body having an enlarged central portion terminating in the inlet and outlet end portions of lesser diameter than the center portion. The inlet end is recessed and threaded to receive an annular seat member 7 and is further recessed as at 8 to form an annular ledge for reasons to be described later. The section of the body containing the discharge or outlet end is also recessed as at $8^a$ for purposes to be later described. Positioned within and clamped between the two body portions and seating on ledges 8 and $8^a$ is a cylindrical cage-like guide member 9 which forms an annular chamber 10 between the guide member and the central enlarged portion of the valve body. The guide member has a central substantially solid sleeve-like portion 11 and an upper open portion having openings 12 spaced by ribs 13 and terminating in an annular ring 14 seating on ledge $8^a$. Openings 12 establish communication between the discharge end of the valve and annular chamber 10. The lower end of guide 9 is also formed with a series of openings 15 therethrough establishing communication between the annular chamber 10 and the inlet end of said valve. The lower end of guide 9 also terminates in an annular ring $15^a$ which seats in ledge 8. Mounted for vertical reciprocatory motion within guide 9 is a piston valve $12^a$ having an annular seating surface $15^a$ adjacent its lower end adapted to seat upon ring 7 to form a tight joint therebetween. In order to divide the incoming fluid through inlet 2 and direct it to the annular chamber 10 the lower end of valve $12^a$ is pointed or cusped to give it a stream line effect. The upper end of the valve may be similarly shaped in order to direct the fluid as it leaves channel 10 and enters the outlet end without causing undue turbulance. In this connection it is to be noted that the openings through the upper and lower portions of guide 9 are also curved to give a smooth uninterrupted contour to the passage through the valve. In order to reduce the weight of the piston valve it is formed of a hollow construction ribbed by webs 16 to give the required strength. The periphery of the valve may be apertured as at 17 to further reduce the weight of the valve and to establish communication between the discharge end of the valve and the interior surface of the valve thus the discharge end of the valve is in direct communication with the outside surface of the upper end of the valve and the inside surface of the lower end of the valve whereas the inlet end is open only to the outside surface of the lower end of the valve.

The operation of the valve is believed to be apparent from the above and will be summarized as follows:

Steam or other fluid entering the inlet 2 will act upon the lower cusped surface of valve 12$^a$ and raise valve 12$^a$ from its seat, the valve being guided by cage-like guide 9. The fluid will then pass through openings 15 and annular chamber 10. Due to the enlarged section of the valve at this portion and due to the stream lining of the lower end of piston value 12$^a$ and the curvature of openings 15 the flow of the fluid is substantially unrestricted. From chamber 10 the fluid passes into and through the discharge end of the valve by way of openings 12. As soon as any back pressure builds up it will act upon the outer surface of the upper end of the valve and the inner surface of the lower end of the valve in conjunction with the weight of the valve and close the same against seat 7. Thus it is apparent that a check valve is provided which is particularly adapted to eliminate pressure drops due to the unrestricted and substantially undeflected flow of the fluid therethrough and is thus particularly well adapted to high pressure work where pressure drops are very important.

It is obvious that minor changes may be made in the details of construction without departing from the spirit and scope of this invention as defined in the claims.

I claim:

1. A check valve comprising a substantially hollow body portion formed in two sections, means for securing said sections together, an inlet formed in one section, an outlet formed in the other section, said inlet and outlet being coaxial, a guiding sleeve clamped between said two sections and forming an annular chamber between said sleeve and said body portion, a valve seat formed in said section having said inlet therein and a piston valve mounted for reciprocatory movements in said guiding sleeve, said piston valve being of hollow construction and having pointed stream line ends.

2. A check valve comprising a substantially hollow body portion formed in two sections, means for securing said sections together, a guiding sleeve of lesser diameter than the interior of said body portion said sleeve being clamped between said two sections and forming an annular chamber between said sleeve and said body portion, said sleeve having openings therethrough at one end leading to the inlet of said valve and at the other end thereof leading to the outlet of said valve, and a hollow piston valve having imperforate ends mounted for reciprocatory movements in said sleeve, said piston valve having apertures through the side walls thereof in cooperative relation with the apertures through one end of said sleeve to establish communication between the discharge end of the valve and the upper interior surface of the lower end of said valve.

In witness of the foregoing I affix my signature.

CLINTON H. BECKWITH.